United States Patent [19]

Pleus

[11] 4,352,325

[45] Oct. 5, 1982

[54] APPARATUS FOR PROCESSING WHOLE BEETS

[76] Inventor: Edwin F. Pleus, 2001 Wisconsin Ave., Sun Prairie, Wis. 53590

[21] Appl. No.: 196,039

[22] Filed: Oct. 10, 1980

[51] Int. Cl.³ .......................... A23N 3/00; A47J 25/00
[52] U.S. Cl. ......................................... 99/483; 99/484; 99/516; 99/545
[58] Field of Search ................. 99/483, 484, 516, 534, 99/536–538, 542–545, 547, 555, 556, 559, 565; 426/484, 511, 615; 209/683, 674; 221/254, 272, 273; 83/356.3, 355, 857, 425

[56] References Cited

U.S. PATENT DOCUMENTS

| | | | |
|---|---|---|---|
| 431,176 | 7/1890 | Thissell | 209/674 |
| 1,146,085 | 7/1915 | McVey | 99/545 |
| 2,556,385 | 6/1951 | Allan | 99/536 |
| 3,004,572 | 10/1961 | Urschel et al. | 83/356.3 |
| 3,057,386 | 10/1962 | Massaro | 83/356.3 |
| 3,094,242 | 6/1963 | Kay et al. | 221/273 |
| 3,696,847 | 10/1972 | Erekson et al. | 99/545 |
| 4,132,162 | 1/1979 | Magnuson | 99/630 |

FOREIGN PATENT DOCUMENTS 2417343 9/1979 France ................................ 209/683

Primary Examiner—Philip R. Coe
Assistant Examiner—Timothy F. Simone
Attorney, Agent, or Firm—Michael, Best & Friedrich

[57] ABSTRACT

Whole beets are graded by size and fed one at a time to a bank of beet cutting assemblies. The whole beets are cut into a cylindrical plug member and a plurality of segment members. The plug members and segment members are separated by a suitable grading mechanism. The segment members are removed from the apparatus for further processing. The plug members are transported to a beet plug heating apparatus wherein they are heated to approximately 160° F. The heated beet plugs are transported to a beet slicing apparatus wherein they are sliced into circular disc-shaped slices. The slices are removed from the apparatus for further processing.

16 Claims, 7 Drawing Figures

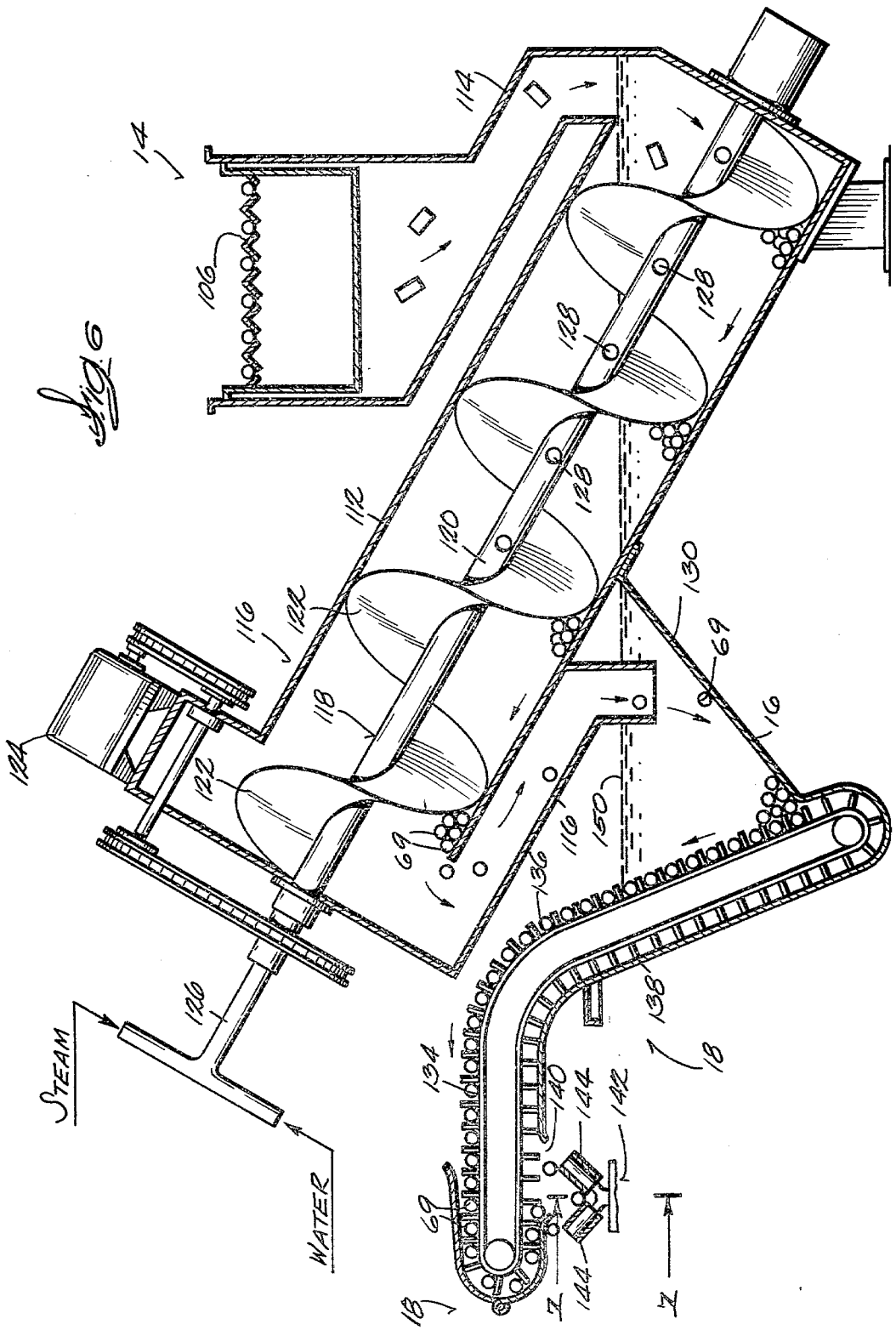

4,352,325

APPARATUS FOR PROCESSING WHOLE BEETS

BACKGROUND OF THE INVENTION

1. Field of the Invention

This invention relates to a method and apparatus for processing whole beets.

2. Description of the Prior Art

The most desirable cut of beet from a consumer preference standpoint is a beet slice of substantially uniform thickness and diameter. The preferable diameter from a consumer preference standpoint is within the range of 1½-2¼ inches in diameter. Such "small" beets were processed by simply slicing each beet from one end to the other which resulted in only a portion of the slices which would fall into the most desirable diameter. Prior to this invention, larger beets of approximately 2½ inches in diameter and larger were normally processed to produce only a lesser desirable cut, i.e., dices, shoestrings or odd sized chunks. Such "large" size beets constituted approximately 40% or 50% of the entire crop.

One object of the present invention is to produce a premium cut beet slice from a large beet, i.e., a slice having a uniform diameter of within a range of approximately 1½-1¾ inches. Another object is to produce a secondary cut (from the same beet) in the shape of a relatively uniform moon-shaped segment which has equal or better consumer preference as the prior diced, shoestring and chunk cuts. Another object is to provide a method and apparatus which accomplishes the desired cut configurations with efficiency, reliability and adaptability to high volume processing.

SUMMARY OF THE INVENTION

An apparatus for processing whole beets comprising a plurality of beet cutting assemblies and a feeding means for feeding a supply of whole beets one at a time to said cutting assemblies. The cutting assemblies include a stationary cutting member and a movable cutting member for forcing each beet through the stationary cutter member. Each of the stationary cutter members is comprised of a circular cutter knife and a plurality of cutter knives extending radially from the circular cutter knife. The action of the cutter members cuts each whole beet into a cylindrical plug member and a plurality of segment members. The plug and segment members are separated from each other. The segments are removed from the apparatus for further processing. The beet plugs are further processed through a heating means and then transmitted to a beet plug slicing means where they are sliced into a plurality of circular disc-shaped slices of a uniform diameter and thickness.

DESCRIPTION OF THE DRAWINGS

FIG. 6 is a side elevation view (viewed from the right of FIG. 2) showing the beet plug heating means and the beet plug slicing means; and FIG. 7 is a view taken along line 7—7 of FIG. 6.

DESCRIPTION OF THE PREFERRED EMBODIMENT

Figures 1, 2:
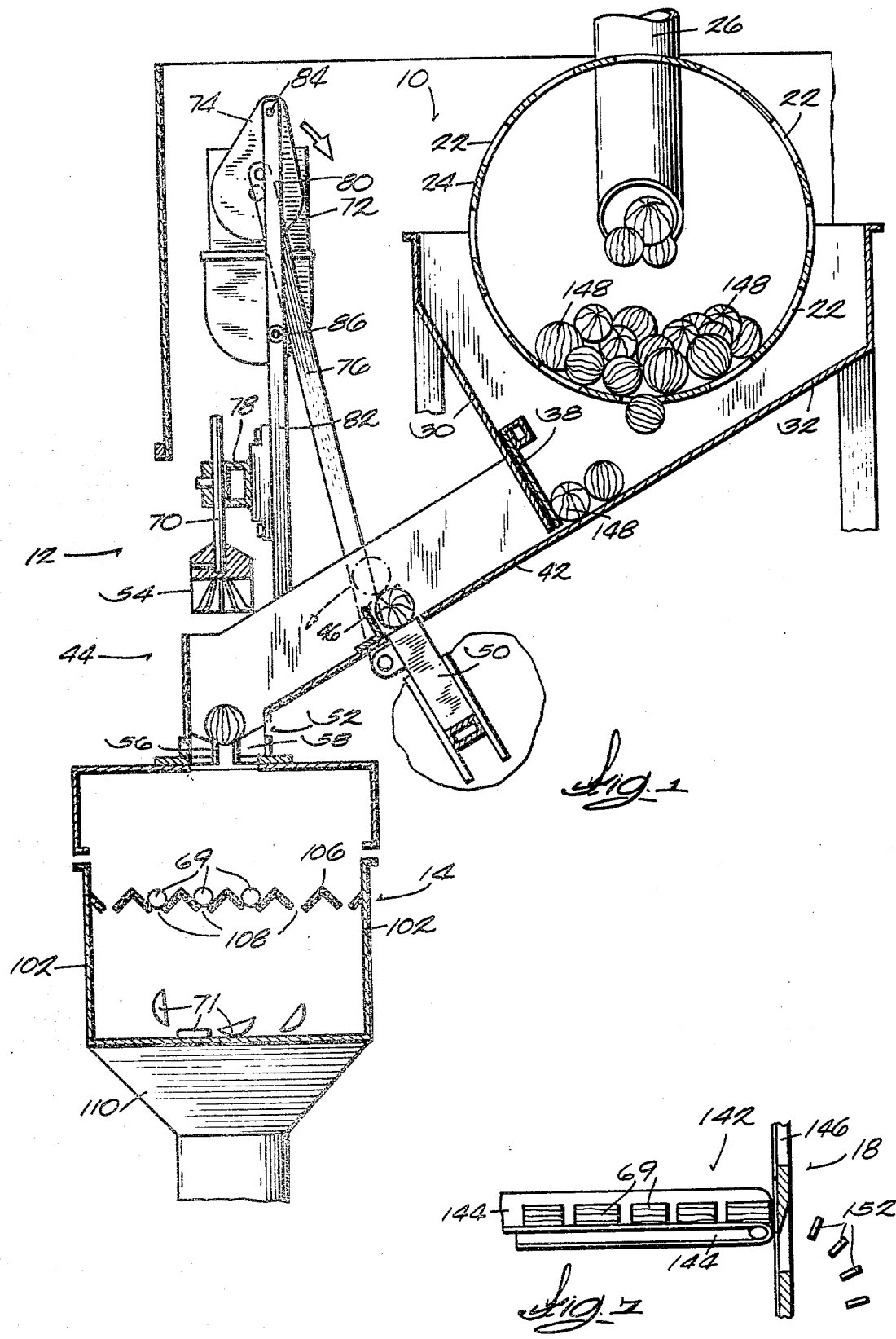
FIG. 1 is a side elevation view (partially sectioned) of the apparatus of the present invention.
FIG. 2 is a front elevation view of the apparatus shown in FIG. 1 (with parts broken away)
Figure 2:
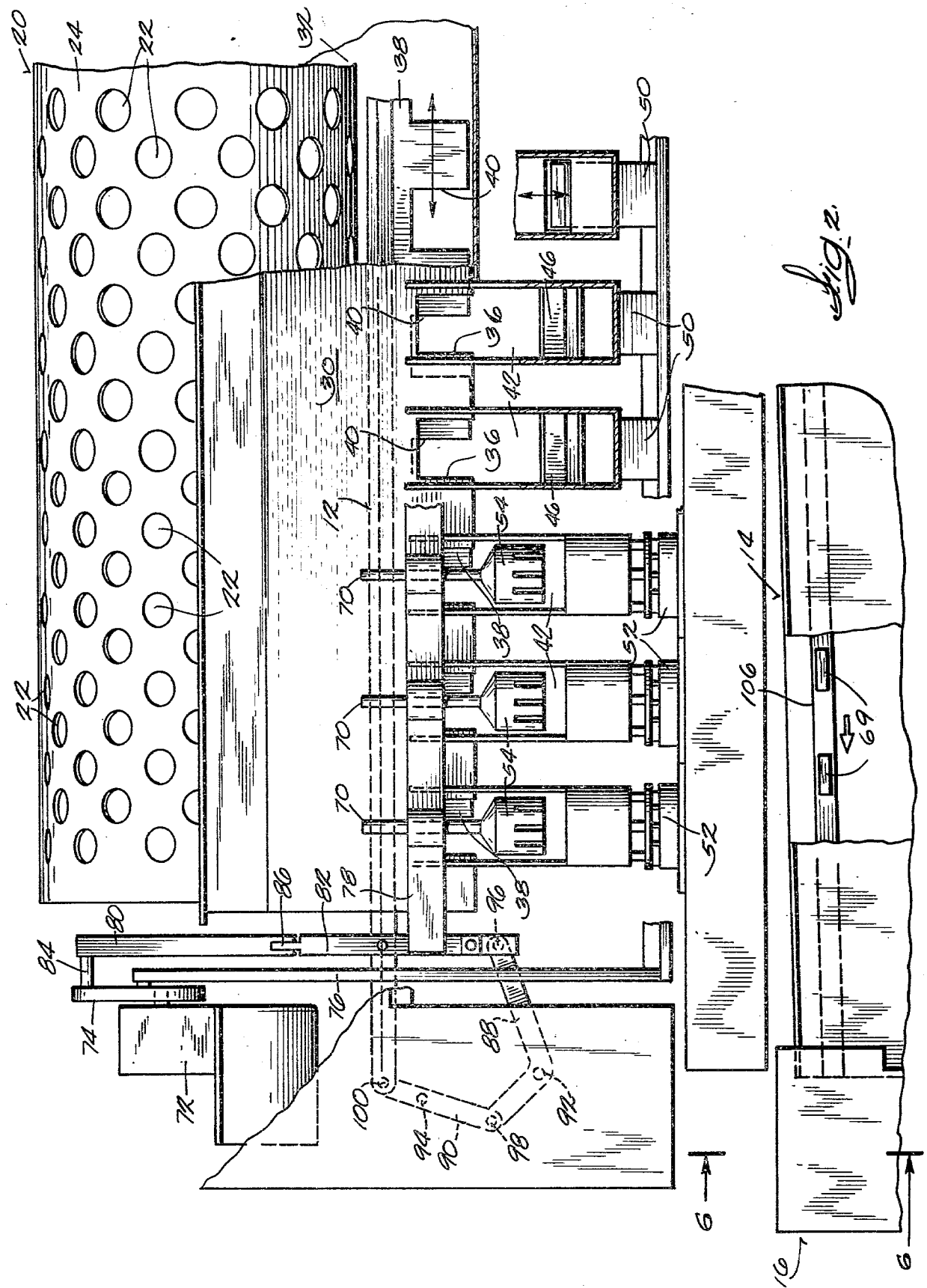

The beet processing apparatus of the present invention is comprised of a beet feeding means 10, a beet plug and segment cutting means 12, a cut beet grading means 14, a beet plug heating means 16 and a beet plug slicing means 18.

Referring to FIGS. 1 and 2, the beet feeding means 10 is comprised of a rotatably mounted drum 20 having a plurality of openings 22 in the cylindrical wall 24 thereof. The beets are fed into the drum 20 by any suitable means such as a feed conduit 26 as shown in FIG. 1.

Mounted below drum 20 is a feed bin 28 having angled bottom wall portions 30, 32 forming a trough-like space 34 in which beets fed from drum 20 can collect.

Wall 30 is provided with a plurality of horizontally spaced openings 36 in the lower portion thereof and has a comb member 38 mounted for reciprocal movement against the inner surface of wall 30 adjacent openings 36. Comb member 38 has a plurality of spaced notches 40 therein which are of approximately the same size and shape as the openings 36 in wall 30.

Adjacent each opening 36 in wall 30 is an inclined chute 42 which leads to a beet cutter assembly 44. Each chute has a stop member 46 mounted in the bottom wall 48 of the chute and an ejector bar 50 mounted adjacent the stop member 46.

Figure 3:
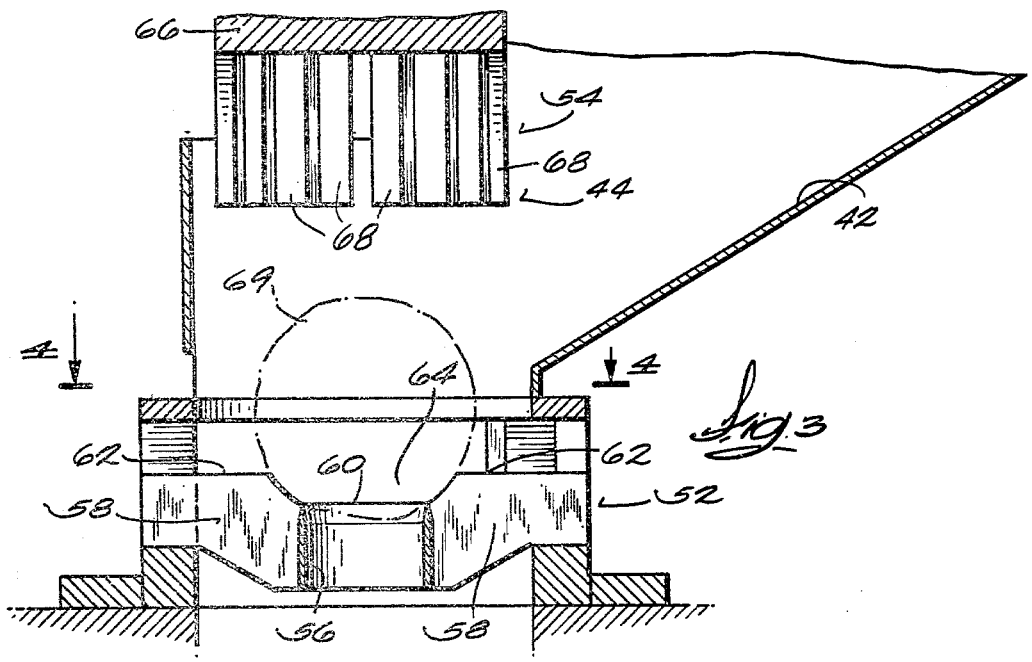
FIG. 3 is a side elevation view of one of the beet cutter assemblies used in the apparatus of FIG. 1.
Figure 4:
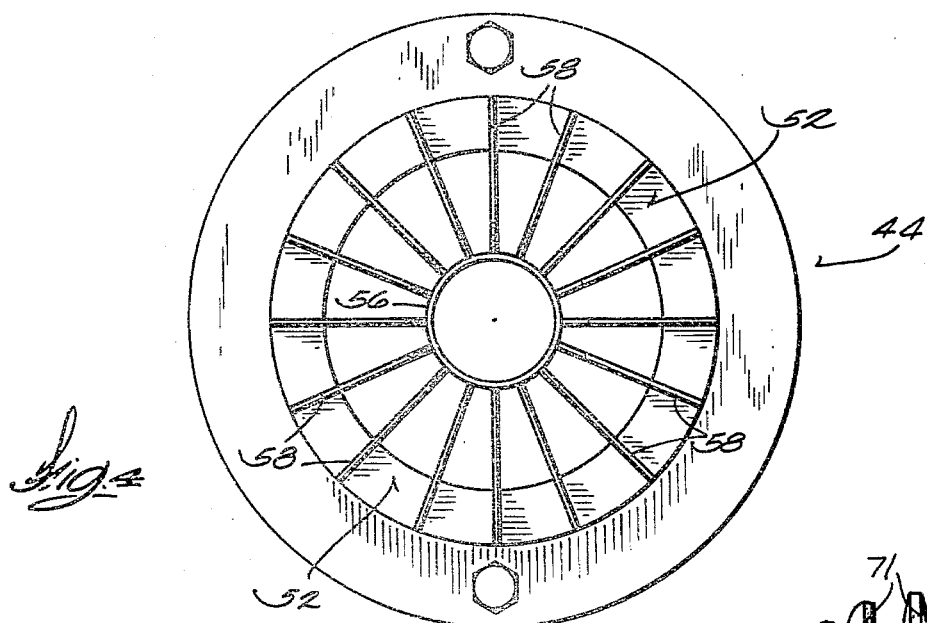
FIG. 4 is a view taken along line 4—4 of FIG. 3.

As indicated above, a beet cutter assembly 44 is mounted at the end of each chute 42. As best shown in FIGS. 3 and 4, each beet cutter assembly 44 is comprised of a stationary cutter member 52 and a movable cutter member 54.

Each cutter member 52 is comprised of a circular cutter knife 56 and a plurality of cutter knives 58 fastened to and extending radially from circular cutter knife 56. In the preferred embodiment cutter knife 56 has a diameter of approximately 1½-1¾ inches. The top edge 60 of each cutter knife 56 and the top edges 62 of cutter knives 58 are sharpened to a knife-edge as best shown in FIG. 3. It should be noted that the knife edges 62 on cutter knives 58 angle downwardly at the inner or central ends thereof towards the knife edge 60 on central cutter knife 56 to thereby form a central pocket 64 (FIG. 3) for receiving a beet to be processed.

Movable cutter member 54 is comprised of a circular abutment portion 66 having a plurality of angularly spaced guide fingers 68 extending downwardly therefrom around the peripheral edge of the abutment portion 66. Guide fingers 68 are spaced so that they will pass freely between cutter knives 58 when movable cutter member 54 is vertically actuated with respect to stationary cutter member 52. Abutment portion 66 of each cutter member 54 is connected to an actuating mechanism by a rod member 70. In the preferred embodiment, cutter members 52 and 54 are dimensioned to accommodate whole beets having a diameter of approximately 2⅞-3½ inches.

The synchronized actuation of comb member 38, ejector bar 50 and movable cutter members 54 can be accomplished by any suitable mechanism. In the preferred embodiment (FIGS. 1 and 2), such mechanism is comprised of a motor drive unit 72 which actuates ejector bars 50 by means of a rotating arm member 74 driven by motor drive 72 and a link member 76 pivotally connected between arm 74 and a support member (not shown) for ejector bars 50.

Figure 5:
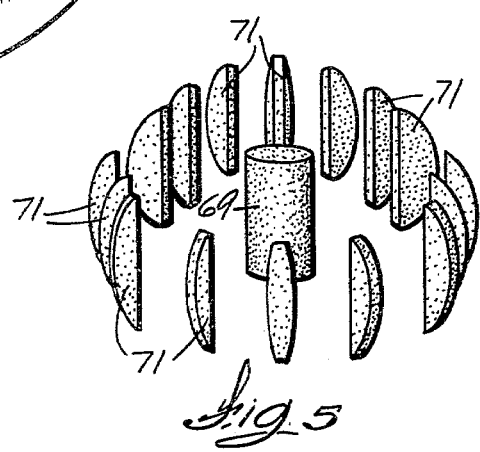
FIG. 5 is a perspective view showing the shape of the various pieces of a whole beet after it has been processed through the beet cutter assembly.

Movable cutter members 54 are all fastened to a horizontal support bar 78 by rod members 70. Support bar 78 is mounted for reciprocal movement by a suitable guide means (not shown). Support bar 78 is reciprocated vertically by a pair of link members 80, 82. Link member 80 is pivotally connected at one end to rotating arm member 74 and at the other end to link member 82 by pivotal connections 84 and 86. As will be explained in more detail hereinafter, relative movement of cutter members 54 with respect to cutter members 52 will cut a whole beet 148 into a cylindrical beet plug 69 and a plurality of beet segments 71 as shown in FIG. 5.

Comb member 38 is actuated (FIG. 2) by a bell crank member 88 and an arm member 90. Bell crank 88 is pivotally mounted on a fixed pivot 92 and arm 90 is mounted on a fixed pivot 94. One end of bell crank 88 is connected to the lower end of arm 82 by a pivot 96 and the other end of bell crank 88 is connected to the lower end of arm 90 by a pivot 98. The upper end of arm 90 is connected to the end of comb member 38 by a pivot 100.

Cut beet grader 14 is mounted beneath the beet cutter means 12 as best shown in FIGS. 1 and 2. Cut beet grader 14 is comprised of side walls 102, a bottom wall 104 and a corrugated grader platform member 106. Grader platform 106 and bottom wall 104 are angled horizontally downwardly from right to left as viewed in FIG. 2. Grader platform member 106 has a plurality of slots 108 therein for separating the small beet segments 71 from the larger beet plugs 69. Grader 14 is also provided with a discharge chute 110 through which beet segments 32 are discharged from the apparatus. The beet plug and segment grading function and the beet plug and segment transportation function of grader unit 14 are facilitated by a vibratory mechanism (not shown) which operates to vibrate the entire grader means 14.

As best shown in FIG. 6, plugs 69 are discharged off the end of grading platform member 106 into the beet plug heater means 16. Beet plug heater means 16 is comprised of a cylindrical heating drum 112 mounted at an angle with respect to the horizontal. An inlet chute 114 is connected to the lower end of drum 112 and an outlet chute 116 is connected to the upper end of the drum 112.

Heater 16 is also provided with a beet plug transport auger assembly 118 mounted interiorly of drum 112 and comprised of a hollow central shaft 120 having a plurality of beet transport flights 122 mounted on the exterior of shaft 120. The auger assembly is rotated by a drive motor 124. A mixture of water and steam is introduced into the auger shaft 120 through pipe 126. The water-steam mixture flows into the drum 112 through a plurality of openings 128 in the lower portion of shaft 120.

As best shown in FIG. 6, the beet plug slicing means 18 is mounted at the outlet of the beet plug heating means 16. Beet plug slicing means 18 is comprised of a receiving reservoir 130 mounted beneath the outlet chute 116 of heater 16. Beet slicing means 18 also includes a beet plug conveyor 132. Conveyor 132 is comprised of an endless conveyor belt 134 having a plurality of beet plug transport flights 136 mounted thereon. The conveyor means also has an exterior wall member 138 having a discharge opening 140 therein. Conveyor 132 extends from the bottom portion of reservoir 130 upwardly out the top of the reservoir to a point adjacent the reservoir.

Mounted beneath discharge opening 140 is a beet plug slicing mechanism 142 comprising a pair of conveyor belts 144, 144 and a rotatably driven knife 146 as best shown in FIG. 7.

OPERATION

The whole beets 148 to be processed are fed into drum 20 through feed conduit 26. By varying the size of openings 22 in drum 20, the drum will function to grade (by size) the whole beets fed to the cutting means 12. For example, as viewed in FIG. 2, the size of openings 22 in the right hand portion of drum 20 are made of one given size A and the openings in the left hand portion of drum 20 are made of a smaller given size B. The size of cutter assemblies 44 are made to correspond to the size of the openings 22, i.e., the assemblies 44 positioned opposite size A openings would be somewhat larger than the assemblies 44 positioned opposite size B openings.

As the drum 20 rotates, the whole beets will pass from the interior of drum 20 out through openings 22 into feed bin 28.

From feed bin 28, the whole beets pass through openings 36 into inclined chutes 42. The reciprocal movement of comb member 38 adjacent openings 36 serves to agitate the beets at openings 36 to thereby facilitate passage of the beets through the openings, i.e., prevents any tendency of the beets to clog up at the openings.

As best shown in FIG. 1, the beets passing from bin 28 will roll down in chutes 42 until they come to rest against stop members 46. Upon actuation of ejector bars 50, the beets resting against stop members 46 will be pushed upwardly until they clear the top of stop members 46. They will then roll the rest of the way down chute 42 into beet cutter assemblies 44.

As each beet rolls into a cutter assembly 44, it will come to rest in the pocket 64 formed in each cutter member 52. Upon downward actuation of movable cutter members 54, abutment portions 66 of members 54 will move into contact with the top of the whole beets resting in pockets 64. The whole beets will be forced against and past knife edges 60 and 62 of cutters 56 and 58 to thereby cut each whole beet into a cylindrical beet plug 69 and a plurality of beet segments 71 as best shown in FIG. 5.

The plugs 69 and segments 71 fall downwardly into cut beet grading means 14. The beet segments 71 will pass through slots 108 in grader platform 106 and will collect on bottom wall 104. They will be vibrated along wall 104 until they reach discharge chute 110 through which the segments are discharged from the apparatus and carried therefrom by any suitable conveyor means (not shown).

Plugs 69 will collect on platform 106 between the corrugations of the platform and will be vibrated along the platform until they reach the end of the platform at which point they will be discharged into the inlet chute 114 of beet plug heater means 16. The plugs will be carried through heater drum 112 from right to left as viewed in FIG. 6 by beet plug transport auger assembly 118. As the beets pass upwardly through drum 112, they will be heated by the hot water-steam mixture injected into the drum through openings 128 in auger shaft 120. The heated beet plugs are discharged from drum 112 through discharge chute 116 into the receiving reservoir 130 of beet plug slicing means 18. The plugs are carried upwardly and out the top of the reservoir 130 by beet plug conveyor 132. A water lever 150 is maintained in reservoir 130 to cushion the movement of the beet plugs into and out of the reservoir.

The plugs are discharged from conveyor 132 through discharge opening 140 into beet plug slicing mechanism 142. The plugs are carried by belts 144, 144 into the path of rotating slicing knife 146. The slices 152 of the plugs 69 passing from the beet plug slicing mechanism are transported from the machine by a suitable conveyor mechanism (not shown).

At this point, it would be appropriate to explain the function and purpose of the beet heating aspects of the present invention. For purposes of maintaining the desired bright red color in the finished product, it is essential that the segments 71 and plug slices 152 be heated sufficiently before they are conveyed from the apparatus for further processing, namely, canning and final cooking. Accordingly, the whole beets fed into drum 20 are preheated to a point for example, wherein the outer portion of the whole beets reaches a temperature of approximately 160°. When the whole beets are cut into segments 71 and plugs 69 by the cutter assemblies 44, the segments 71 will have been heated sufficiently to maintain the desired color. However, the plugs 69 cut from the center of the whole beet will not have been heated to the same degree as the segments 71 and therefore require further heating. This is the reason for the use of the beet plug heating means 14 which serves to heat the plugs to approximately 160° so that the plugs (slices 152) as well as the segments will be preheated sufficiently to produce the desired color.

I claim:

1. Apparatus for processing whole beets comprising:
(1) a plurality of beet cutting assemblies for cutting whole beets into a cylindrical plug member and a plurality of segment members;
(2) feeding means for feeding a supply of whole beets to said beet cutting assemblies;
(3) grading means for separating the plugs from the segments; and
(4) beet plug slicing means for slicing the cylindrical beet plugs into a plurality of circular disc-shaped slices.

2. Apparatus according to claim 1 in which said beet cutter assemblies are comprised of a stationary cutting member (52) and a movable cutter member (54) for forcing each beet through the stationary cutter member, each of said stationary cutter members comprised of a circular cutter knife (56) and a plurality of cutter knives (58) extending radially from said circular cutter knife.

3. Apparatus according to claim 2 in which said movable cutter member is comprised of an abutment portion (66) having a plurality of guide fingers (68) extending outwardly therefrom.

4. Apparatus according to claim 1 in which said feeding means includes a grading means for grading the whole beets according to size, said beet cutting assemblies being dimensioned to correspond to the size of the beets fed thereto.

5. Apparatus according to claim 1 in which said beet feeding means includes an inclined chute (42) leading to each of said beet cutting assemblies, each of said chutes having a stationary stop member (46) and a movable ejector bar (50) mounted therein, said stop member positioned to stop beets rolling down said chutes and said ejector bars adapted to push a beet over the tops of said stop members to thereby cause whole beets to be fed to said beet cutting assemblies one at a time.

6. Apparatus according to claim 1 in which said been plug slicing means includes a receiving reservoir (130), a beet plug conveyor means (132) and a beet plug slicing mechanism (142), said conveyor means operative to convey beet plugs from said receiving reservoir to said beet plug slicing mechanism.

7. Apparatus according to claim 6 in which a water level is maintained in said receiving reservoir to cushion the movement of the beet plugs into and out of the reservoir.

8. Apparatus for processing whole beets comprising:
(1) a plurality of beet cutting assemblies for cutting whole beets into a cylindrical plug member and a plurality of segment members;
(2) feeding means for feeding a supply of whole beets to said beet cutting assemblies;
(3) grading means for separating the plugs from the segments;
(4) beet plug heating means for heating the beet plugs after they have been graded; and
(5) beet plug slicing means for slicing the cylindrical beet plugs into a plurality of circular disc-shaped slices.

9. Apparatus according to claim 8 in which said beet plug heating means is comprised of a cylindrical heating drum (112) and a beet plug transport auger assembly (118) mounted therein for transporting the beet plugs from one end of the drum to the other.

10. Apparatus according to claim 9 in which said beet plug transport auger assembly is comprised of a hollow central shaft (120) having a plurality of beet transport flights (122) mounted on the exterior thereof, said shaft having a plurality of openings therein through which a heating medium is introduced into the drum.

11. Apparatus according to claim 8 in which said beet cutting assemblies are comprised of a stationary cutter member (52) and a movable cutter member (54) for forcing each beet through the stationary cutter member, each of said stationary cutter members comprised of a circular cutter knife (56) and a plurality of cutter knives (58) extending radially from said circular cutter knife.

12. Apparatus according to claim 11 in which said movable cutter member is comprised of an abutment portion (66) having a plurality of guide fingers (68) extending downwardly therefrom.

13. Apparatus according to claim 8 in which said feeding means includes a grading means for grading the whole beets according to size, said beet cutting assemblies being dimensioned to correspond to the size of the beets fed thereto.

14. Apparatus according to claim 8 in which said beet feeding means includes an inclined chute (42) leading to each of said beet cutting assemblies, each of said chutes having a stationary stop member (46) and a movable ejector bar (50) mounted therein, said stop member positioned to stop beets rolling down said chutes and said ejector bars adapted to push a beet over the tops of said stop members to thereby cause whole beets to be fed to said beet cutting assemblies one at a time.

15. Apparatus according to claim 8 in which said beet plug slicing means includes a receiving reservoir (130), a beet plug conveyor means (132) and a beet plug slicing mechanism (142), said conveyor means operative to convey beet plugs from said receiving reservoir to said beet plug slicing mechanism.

16. Apparatus according to claim 15 in which a water level is maintained in said receiving reservoir to cushion the movement of the beet plugs into and out of the reservoir.

* * * * *

UNITED STATES PATENT AND TRADEMARK OFFICE
CERTIFICATE OF CORRECTION

PATENT NO. : 4,352,325
DATED : October 5, 1982
INVENTOR(S) : Edwin F. Pleus

It is certified that error appears in the above—identified patent and that said Letters Patent is hereby corrected as shown below:

Column 5, Line 2, After "water" delete "lever" and substitute therefor ---level---

Line 29, After "means" delete the numeral "14" and substitute therefor ---16---

Line 45, After "stationary" delete "cutting" and substitute therefor ---cutter---

Column 6, Line 1, After "said" delete "been" and substitute therefor ---beet---

Signed and Sealed this

Twenty-first Day of June 1983

[SEAL]

Attest:

DONALD J. QUIGG

Attesting Officer

Acting Commissioner of Patents and Trademarks